United States Patent [19]
Kishimoto

[11] Patent Number: 5,312,236
[45] Date of Patent: May 17, 1994

[54] GEAR PUMP FOR NON-NEWTONIAN FLUID

[75] Inventor: Katsuji Kishimoto, Kyoto, Japan

[73] Assignee: Shimadzu Corporation, Kyoto, Japan

[21] Appl. No.: 43,262

[22] Filed: Apr. 6, 1993

[30] Foreign Application Priority Data

May 27, 1992 [JP] Japan .................................. 4-135172

[51] Int. Cl.$^5$ .............................................. F01C 1/18
[52] U.S. Cl. .................................... 418/206; 418/131
[58] Field of Search ............... 418/191, 206, 102, 131, 418/132

[56] References Cited

U.S. PATENT DOCUMENTS 4,056,337  11/1977  Zorn et al. ........................... 418/131

Primary Examiner—Richard A. Bertsch
Assistant Examiner—Charles G. Freay
Attorney, Agent, or Firm—Heller, Ehrman, White & McAuliffe

[57]  ABSTRACT

A pump gear for force-feeding of a non-Newtonian fluid has a pair of gears with intermeshing teeth, each flanked by members such as bearings with inner surfaces opposite to its side surfaces. The gaps that are formed between the side surfaces of the gears and the inner surfaces of the flanking members are tapered such that their width increases radially, making the speed of fluid flow substantially uniform throughout inside the gaps.

12 Claims, 3 Drawing Sheets

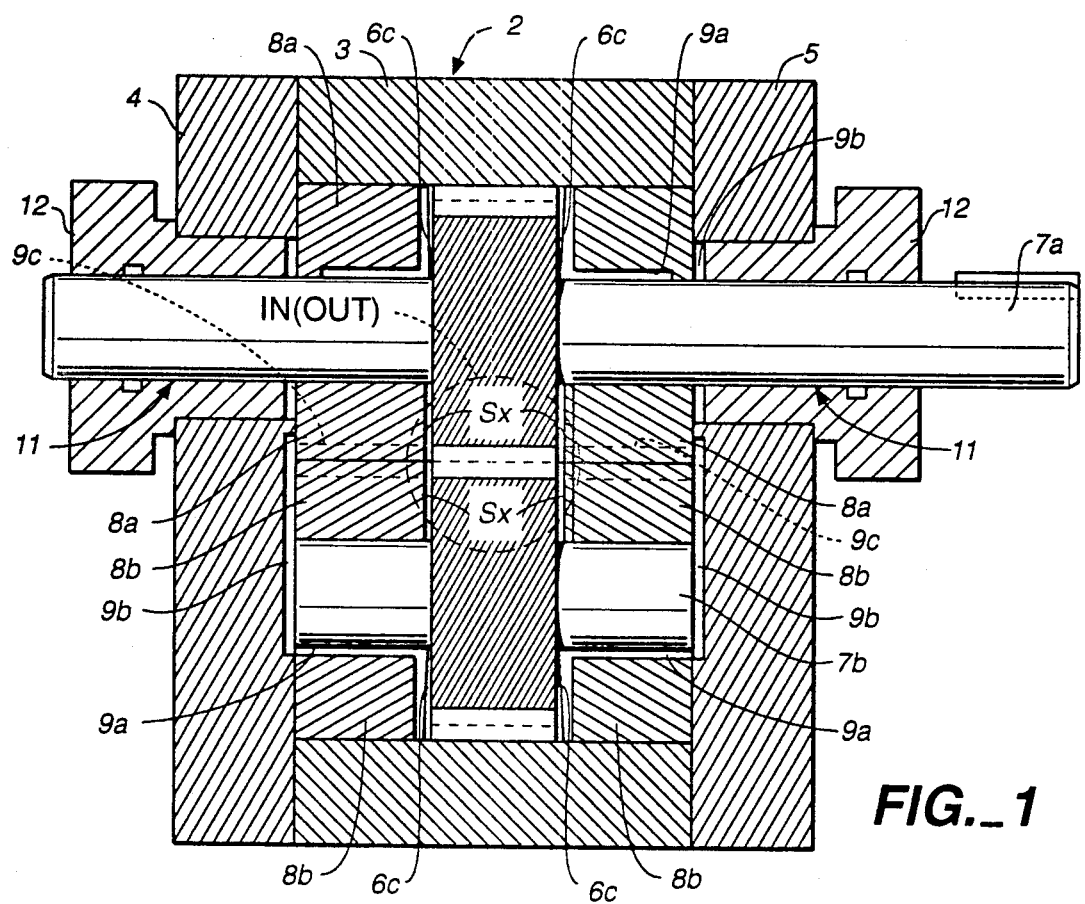
FIG._1
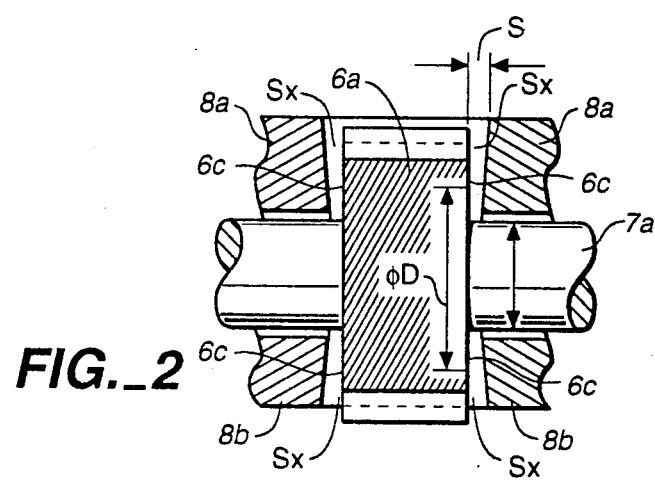
FIG._2

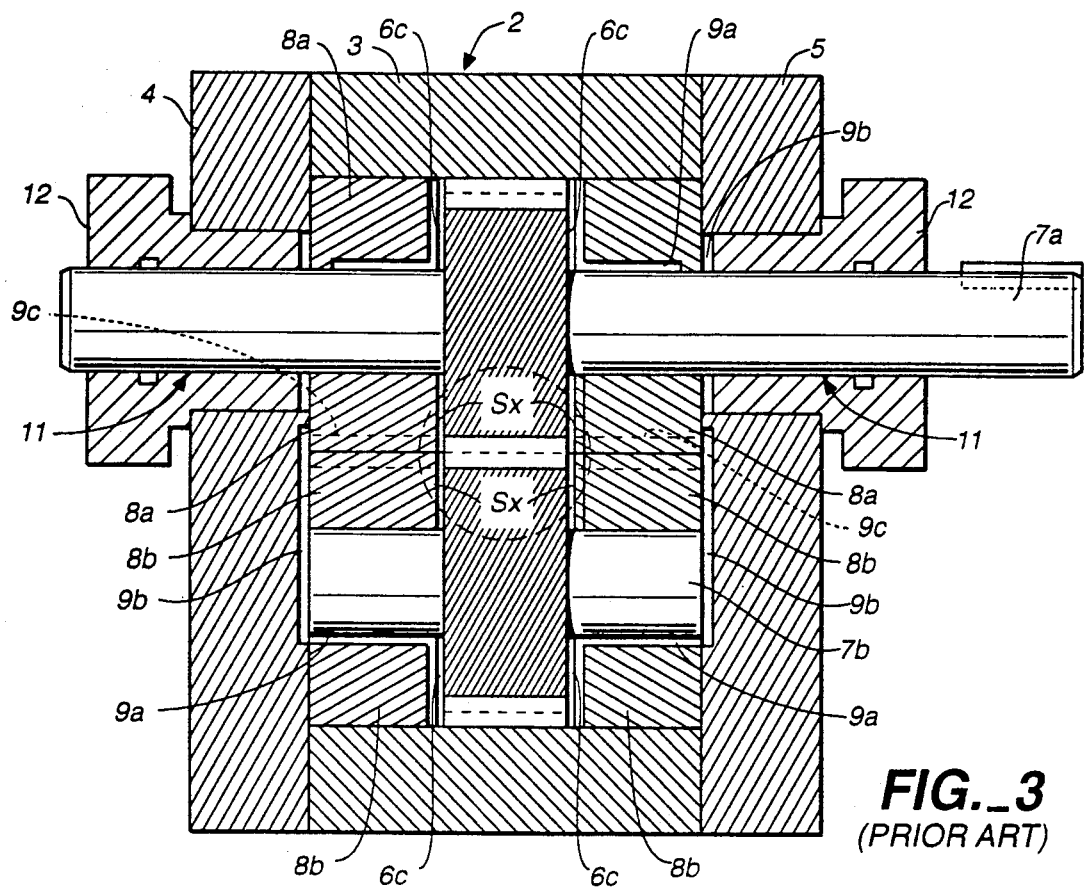
FIG._3
(PRIOR ART)
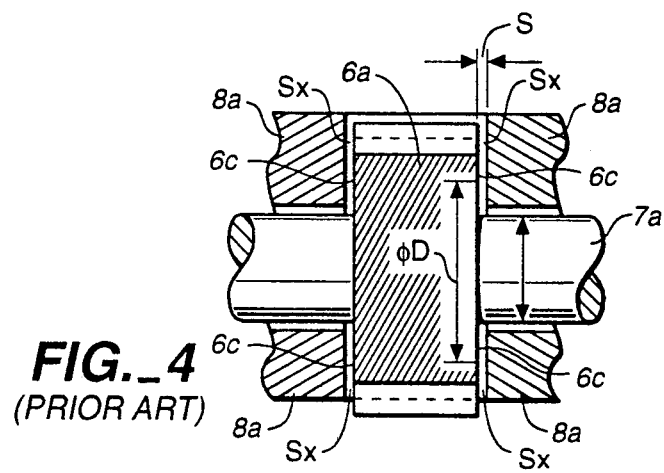
FIG._4
(PRIOR ART)

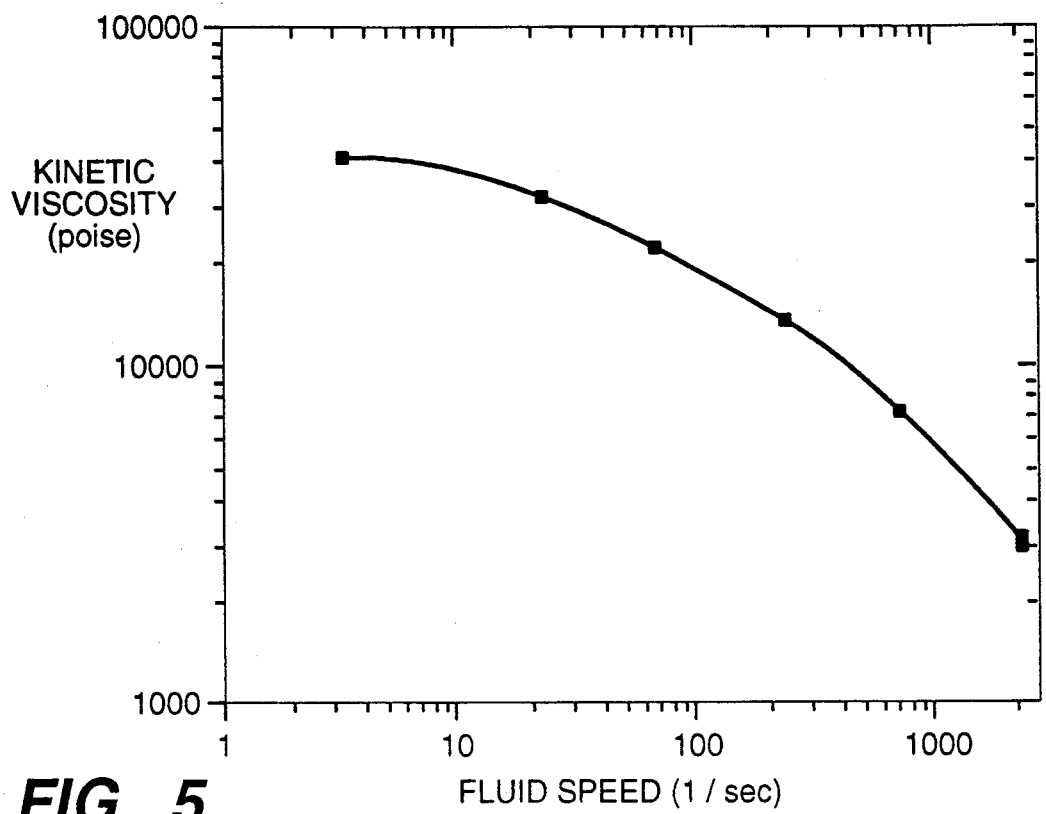
FIG._5
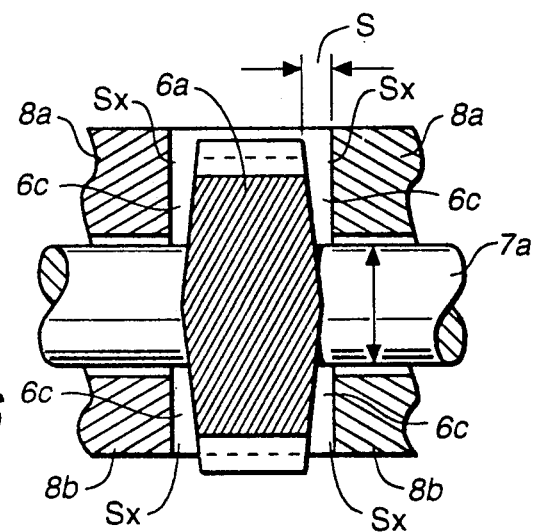
FIG._6

GEAR PUMP FOR NON-NEWTONIAN FLUID

BACKGROUND OF THE INVENTION

This invention relates to gear pumps and, more particularly, to gear pumps which are specially suited for use in a polymerization process or an extrusion molding line for all kinds of non-Newtonian fluid such as molten resins like polyethylene and polystyrene.

As shown in FIG. 3, a prior art gear pump for transporting non-Newtonian fluids has a pair of flat gears $6a$ and $6b$ having mutually intermeshing teeth and contained inside a casing 2. The casing 2 is comprised of a housing 3 having its open ends on both sides sealed with a front cover 5 and a rear cover 4. The gear shaft $7a$ which supports one of the gears ($6a$) is connected to a power source (not shown) and will be referred to as the drive gear shaft. The gear shaft $7b$ around which the other gear $6b$ rotates will be referred to as the driven gear shaft. These two gear shafts $7a$ and $7b$ are rotatably supported by bearing members $8a$ and $8b$, respectively, which also serve as side plates for sealing the side surfaces of the gears $6a$ and $6b$.

The drive gear shaft $7a$ penetrates both the front cover 5 and the rear cover 4, extending outward. Gland cases 12 are provided where the drive gear shaft $7a$ penetrates the front and rear covers 5 and 4 so as to prevent the fluid from leaking out of the casing 2. Numerals 11 in FIG. 3 indicate where the drive gear shaft $7a$ penetrates the front and rear covers 5 and 4. A suction port IN and a discharge port OUT are provided where the mutually intermeshing teeth of the gears $6a$ and $6b$ sequentially disengage from each other and engage with each other, respectively, as rotary power is applied to the drive gear shaft $7a$ such that a fluid is sucked in through the suction port IN and discharged out through the discharge port OUT in a well-known manner.

Liquid-pooling grooves $9a$ are provided on the inner peripheral surfaces of the bearing members $8a$ and $8b$, reflux grooves $9b$ are provided on the inner surfaces of the covers 4 and 5, and reflux holes $9c$ are provided on the suction side of the casing 2 such that a portion of the fluid flowing out through the discharge port OUT will return to the oppositely situated suction port IN by passing through the liquid-pooling grooves $9a$, reflux grooves $9b$ and reflux holes $9c$, lubricating the bearing members $8a$ and $8b$ at the same time. Another portion of the fluid will flow through the side gaps $S_x$ between the side surfaces $6c$ of the gears $6a$ and $6b$ and the bearing members $8a$ and $8b$ in the direction normal to the page of the figure, returning from the discharge port OUT to the suction port IN, serving to lubricate the bearing members $8a$ and $8b$ and to slidingly seal the side surfaces of the gears $6a$ and $6b$.

With a gear pump thus structured, however, it is difficult to accurately estimate the internal leakage and the power loss at the time of assembly, and errors are likely to occur in the discharge rate and required power at the time of actual operation. As a result, the user is likely to experience insufficiency in lubrication and insufficiency in power.

One of the reasons for this problem may be explained as follows. The magnitude of leakage per unit time $q_s$ at the side gaps $S_x$ is given by:

$$q_s = (k_1 + k_2) P S^3 / \mu \qquad \text{Formula (1)}$$

where $k_1$ and $k_2$ are constants determined by the design of the pump, p is the pressure of the discharged fluid, $\mu$ is the viscosity of the fluid (that is, its kinetic viscosity related to its motion) and S is the width of the side gaps. The power loss $w_s$ of the gear pump due to the friction on the side surfaces $6c$ of the gears $6a$ and $6b$ is given by:

$$w_s = (k_3 + k_4) \mu n^2 / S \qquad \text{Formula (2)}$$

where $k_3$ and $k_4$ are constants and n is a coefficient determined by the design of the pump. On the other hand, the viscosity $\mu$ of a non-Newtonian fluid varies according to the speed of fluid motion (in the direction perpendicular to the page of FIG. 1) $\gamma$ of the fluid typically as shown in FIG. 5, but the speed of fluid motion $\gamma$ at a point at radial distance D from the shaft $7a$ or $7b$ is given by $$\gamma = \pi D N / S \qquad \text{Formula (3)}$$

where N is the number of rotation per unit time of the shafts $7a$ and $7b$. FIG. 5 indicates that $\mu$ increases as $\gamma$ decreases, and since the width S of the side gaps is constant radially (that is, independent of radial distance D) in the case of a prior art pump as shown in FIG. 3, this means that the kinetic viscosity $\mu$ of the fluid is lower at points at a larger radial distance D (or farther from the shaft $7a$ or $7b$).

Accordingly, the results of calculations for leakage $q_s$ and power loss $w_s$ will vary significantly, depending on what value is used as the kinetic viscosity $\mu$. One may attempt to simply take the average value between the maximum and the minimum, but the fluid does not flow smoothly if the speed of fluid motion $\gamma$ varies throughout the side gaps $S_x$, and the actual viscosity of the fluid is likely to be very different from a theoretically calculated value. In other words, it is very difficult to design a pump which actually functions as theoretically predicted.

SUMMARY OF THE INVENTION

It is therefore an object of the present invention to provide a gear pump of which the discharge rate and the value of required power can be accurately determined by calculation A gear pump embodying the present invention, with which the above and other objects can be accomplished, may be characterized not only as comprising a pair of gears supported by bearing members and having intermeshing teeth, and side walls at the sides of the gears so as to slidably seal a volume space such that force-feeding of a non-Newtonian fluid is possible therethrough, but also wherein the gap S between the side surface of the gears and the side wall opposite thereto increases radially in proportion with the radial distance such that the speed of motion of the fluid, and hence also its kinetic viscosity become approximately uniform all over the side surfaces of the gears.

With a gear pump thus formed, the changes in D and S in aforementioned Formula (3) cancel each other such that the speed of motion $\gamma$ becomes uniform and the kinetic viscosity $\mu$ becomes constant in Formulas (1) and (2). As a result, the right-hand sides of Formulas (1) and (2) become functions of only the gap S. In other words, if it is made a structural prerequisite that the speed of motion $\gamma$ be uniform, the fluid will flow smoothly and its viscosity becomes approximately uniform throughout the side gaps. Moreover, since the average value of the side gap S can be obtained easily, design errors can be reduced significantly if the leakage $q_s$ and the power loss $w_s$ are calculated from Formulas (1) and (2) by using such an average value.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a vertical sectional view of a gear pump embodying the present invention;

FIG. 2 is an enlarged view of a portion of FIG. 1;

FIG. 3 is a vertical sectional view of a prior art gear pump;

FIG. 4 is an enlarged view of a portion of FIG. 3;

FIG. 5 is a graph showing an exemplary relationship between the speed of motion of a non-Newtonian fluid $\gamma$ and its kinetic viscosity $\mu$; and FIG. 6 is an enlarged vertical sectional view of a portion of another gear pump embodying the present invention.

DETAILED DESCRIPTION OF THE INVENTION

A gear pump embodying the present invention will be described next with referenced to FIGS. 1 and 2, wherein components which are substantially like those shown in and described with referenced to FIGS. 3 and 4 are indicated by the same numerals.

The gear pump shown in FIGS. 1 and 2 is different from the prior art gear pump shown in FIGS. 3 and 4 in that the inner surfaces of the bearing members 8a and 8b flanking the gears 6a and 6b are inclined, or tapered, radially from the center of each axis such that, when the bearing members 8a and 8b are installed as shown opposite to the gears 6a and 6b, side gaps $S_x$ are formed between them with the width S of the gap increasing proportionally to the radial distance D from the corresponding axis of rotation. This proportionality relationship will be expressed as $$S = k_5 D. \qquad \text{Formula (4)}$$

If the gaps $S_x$ are formed as described above, substitution of Formula (4) into Formula (3) yields a new expression for the speed of motion as follows:

$$\gamma = \pi N / k_5, \qquad \text{Formula (5)}$$

that is, the speed of fluid motion is no longer a function of D, but is constant. This means that the kinetic viscosity $\mu$ in Formulas (1) and (2) may be treated as a constant, or $\mu = k_6$, and Formulas (1) and (2) may be rewritten as follows:

$$q_s = (k_1 + k_2) P S^3 / k_6 \qquad \text{Formula (1')}$$

$$w_s = (k_3 + k_4) k_6 n^2 / S. \qquad \text{Formula (2')}$$

This means that both $q_s$ and $w_s$ are a function of S alone.

As explained above, if the gear pump itself is designed such that the speed of fluid flow $\gamma$ is constant, the fluid can flow smoothly and have about the same viscosity throughout the side gaps. The average gap value S can be obtained easily, and if the leakage $q_s$ and power loss $w_s$ are calculated by using such average value, design errors can be made significantly less than if these values are calculated by a prior art method. In other words, with gear pumps designed according to the present invention, discharge rate and required power can be more accurately calculated. The present invention has a further effect of stabilizing the lubrication of the bearing members and problems of burning are unlikely to arise.

Another advantage of having tapered side gaps $S_x$ is that such tapered side gaps act effectively like a wedge such that the grooves 9a–9c, which are primarily for lubrication, may be dispensed with. The return flow of the fluid will also become smoother, and there will be a better pressure balance on side surfaces 6a of the gears 6a and 6b, reducing the generation of a force of thrust. Even if the gears 6a and 6b are pushed to one side by a thrust, it is always possible to secure a minimum gap because the side gaps $S_x$ are tapered.

Although the present invention has been described above with reference to only one embodiment of the invention, this is not intended to limit the scope of the invention. Many amendments and variations are possible within the scope of the invention. For example, although gears with flat side surfaces and bearing members with tapered inner side surfaces were disclosed in FIGS. 1 and 2, side gaps may be formed between tapered side surfaces of the gears and flat inner surfaces of the bearing members as shown in FIG. 6. Moreover, the tapered side gaps may be formed between the side surfaces of the gears and side plates which are separate from the bearing members.

In summary, such modifications and variations that may be apparent to a person skilled in the art are intended to be within the scope of the invention.

What is claimed is:

1. In a gear pump comprising a pair of gear means with intermeshing teeth and side surfaces for force-feeding a non-Newtonian fluid, each of said gears being flanked by flanking members having inner surfaces opposite said side surfaces to form gaps therebetween the improvement wherein said gaps have width which increases radially such that the kinematic viscosity is substantially uniform throughout said gaps.

2. The gear pump of claim 1 wherein said width of said gaps increases proportionally to radial distance from the axis of rotation of said gear.

3. The gear pump of claim 1 wherein said inner surfaces of said flanking members are tapered and said side surfaces of said gears are flat.

4. The gear pump of claim 1 wherein said flanking members are bearings serving to rotatably support said gears.

5. In a gear pump for force-feeding a non-Newtonian fluid comprising a pair of gears with intermeshing teeth and side surfaces, each of said gears being flanked by flanking members having inner surfaces opposite said side surfaces to form gaps therebetween, the improvement where said gaps have width which increases radially, said inner surfaces of said flanking members are flat and said side surfaces of said gears are tapered.

6. The gear pump of claim 5 wherein said width of said gaps increases proportionally to radial distance from the axis of rotation of said gear.

7. The gear pump of claim 5 wherein said inner surfaces of said flanking members are tapered and said side surfaces of said gears are flat.

8. The gear pump of claim 5 wherein said flanking members are bearings serving to rotatably support said gears.

9. In a gear pump for force-feeding a non-Newtonian fluid comprising a pair of gears with intermeshing teeth and side surfaces, each of said gears being flanked by flanking members having inner surfaces opposite said side surfaces to form gaps therebetween, the improvement where said gaps have width which increases radially such that the speed of fluid flow is substantially uniform throughout said gaps.

10. The gear pump of claim 9 wherein said width of said gaps increases proportionally to radial distance from the axis of rotation of said gear.

11. The gear pump of claim 9 wherein said inner surfaces of said flanking members are tapered and said side surfaces of said gears are flat.

12. The gear pump of claim 9 wherein said flanking members are bearings serving to rotatably support said gears.

* * * * *